US00RE50987E

(19) United States
(12) Reissued Patent
Gupta et al.

(10) Patent Number: US RE50,987 E
(45) Date of Reissued Patent: Aug. 11, 2026

(54) METHOD OF RECOVERING METALS FROM SPENT Li-ION BATTERIES

(71) Applicant: ATTERO RECYCLING PVT. LTD., Noida (IN)

(72) Inventors: Nitin Gupta, Roorkee (IN); G. Prabaharan, Roorkee (IN); Smruti Prakash Barik, Roorkee (IN); Bhuvnesh Kumar, Roorkee (IN)

(73) Assignee: ATTERO RECYCLING PVT. LTD., Roorkee (IN)

(21) Appl. No.: 18/207,129

(22) Filed: Jun. 7, 2023

Related U.S. Patent Documents

Reissue of:
(64) Patent No.: 11,031,641
Issued: Jun. 8, 2021
Appl. No.: 15/742,511
PCT Filed: Jun. 27, 2016
PCT No.: PCT/IB2016/053811
§ 371 (c)(1),
(2) Date: Jan. 7, 2018
PCT Pub. No.: WO2017/006209
PCT Pub. Date: Jan. 12, 2017

(30) Foreign Application Priority Data

Jul. 6, 2015 (IN) ..... 2048/DEL/2015

(51) Int. Cl.
*H01M 10/54* (2006.01)
*C01D 7/06* (2006.01)
(Continued)

(52) U.S. Cl.
CPC ..... *H01M 10/54* (2013.01); *C01D 7/06* (2013.01); *C01G 51/04* (2013.01); *C22B 1/005* (2013.01); *Y02W 30/84* (2015.05)

(58) Field of Classification Search
None
See application file for complete search history.

(56) References Cited

U.S. PATENT DOCUMENTS 6,120,927 A * 9/2000 Hayashi ..... H01M 10/54 423/179.5
8,616,475 B1 12/2013 Smith et al.
(Continued)

FOREIGN PATENT DOCUMENTS

CN 1601805 A * 3/2005
CN 102162034 A * 8/2011
(Continued)

OTHER PUBLICATIONS

Dictionary.com https://www.dictionary.com/browse/shred—accessed Jul. 30, 2025.*

*Primary Examiner* — Lee E Sanderson
(74) *Attorney, Agent, or Firm* — S.J. Intellectual Property LTD

(57) ABSTRACT

The present invention relates to an improved process and method of recovering metals of value from used Lithium Ion batteries. More particularly, the invention provides a method for recovering cobalt and lithium along with other metals of value wherein the method includes physical processes for separation, limiting the use of chemical for removing minor impurities. Majority of elements were separated by physical processes instead of chemical processes which gives the benefit of cost saving in chemical treatment of liquid and solid effluents. The invention provides for a cost effective, economic and environmental friendly process for recovering metals of value.

18 Claims, 2 Drawing Sheets

(51) Int. Cl.
*C01G 51/04* (2025.01)
*C22B 1/00* (2006.01)

(56) References Cited

U.S. PATENT DOCUMENTS

| | | | | |
|---|---|---|---|---|
| 8,882,007 | B1 * | 11/2014 | Smith | H01M 10/54 241/21 |
| 2007/0196725 | A1 * | 8/2007 | Tedjar | C22B 26/12 429/49 |
| 2013/0302226 | A1 | 11/2013 | Wang et al. | |

FOREIGN PATENT DOCUMENTS

| | | | | | |
|---|---|---|---|---|---|
| EP | 1049190 | A1 | | 11/2000 | |
| IT | VI20100232 | A1 | * | 7/2013 | |
| JP | 2000264641 | A | * | 9/2000 | |
| WO | WO-2010149611 | A1 | * | 12/2010 | B02C 19/0056 |
| WO | 2017145099 | A1 | | 8/2017 | |

* cited by examiner

METHOD OF RECOVERING METALS FROM SPENT Li-ION BATTERIES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is a reissue of U.S. Pat. No. 11,031,641 issued on Jun. 8, 2021.*

FIELD OF THE INVENTION

The present invention relates to an improved process of recovering valuable metals from used Lithium Ion batteries. More particularly, the invention provides a process for recovering cobalt and lithium along with other valuable metals wherein the process majorly includes physical processes for separation, limiting the use of chemical for removing minor impurities. The invention provides for a cost effective, economic and environmental friendly process for recovering valuable metals.

BACKGROUND OF THE INVENTION

A lithium-ion battery, commonly referred to as Li-ion battery or LIB, is classified as rechargeable type battery in which lithium ions move from the negative electrode to the positive electrode during discharge and back when charging. Li-ion batteries use an intercalated lithium compound as the electrode material, compared to the metallic lithium used in a non-rechargeable lithium battery. The electrolyte, which allows ionic movement, and two electrodes are the constituent components of a lithium-ion cell.

The lithium ion battery has many merits, such as a high electrical energy density, a high working voltage, a long cyclic life and no memory effect, etc., the lithium ion battery has been recognized as a battery system with a high potential for development. Therefore, Lithium-ion batteries are a preferred choice of energy supplying units in consumer electronics. The most popular type of rechargeable batteries for consumer electronics, are batteries that provides high energy density, no memory effect, and slow loss of charge when not in use. Beyond consumer electronics, LIBs are also growing in popularity for military, battery powered electric vehicle and aerospace applications. For example, lithium-ion batteries are replacing the lead acid batteries that have been used commonly in golf carts and other similar utility vehicles. Such transformation are also due to the fact that lithium-ion battery packs are considerably lighter than their conventional counterparts when compared to the voltage produced from a lead-acid batteries. Further since the weight is not an issue, there are no modifications required to carry these bulky power source.

Accordingly, the use of lithium ion batteries is witnessing tremendous market growth, as we are unveiling its applicability and potential. Consequently, along with an increase in the use of lithium ion batteries, there is need for a system and method for recycling and regenerating waste lithium ion batteries to solve the problems of contamination and risks associated with the use of lithium ion batteries.

A particular lithium ion battery further comprises protection circuit boards or modules in order to protect them from being overcharged and increase its shelf life. Generally, the protection circuit boards are connected to positive and negative terminals of the lithium ion battery; and have gold plated conductive patterns that help in the supervision of charging and discharging state of the batteries. In other words, the protection circuit boards help in preventing over-discharging and over-charging in lithium ion batteries. For achieving this protection property, variable types of gold plating (JP2001268808A) can be provided to the conductive patterns. When lithium ion batteries gets exhausted or become useless, these metal rich components demand some effective approaches so that valuable metals can be reclaimed and reutilized.

Currently, there are two major recycling processes being used for lithium ion batteries:

1) The batteries are fed into electric furnaces already containing molten steel with the contained anode reducing carbons along with the separators and with flux to enrich the forming stainless steel alloy in cobalt, nickel and/or manganese. The lithium is fluxed into the slag and may be recovered at high cost with several extra processing steps. This is known as umicore process.

2) The batteries are processed through a hammer mill and screened −25 mesh slurry filtered and packaged. This slurry contains about 30% metals from the cathode along with the carbon. This metal rich mixture is shipped to an electric smelter for utilization in making steels. The copper and Aluminium foils are separately recovered from the process.

Although cobalt and nickel is recovered along with the manganese for scrap, the substantial value of the lithium metal oxide cathode material is lost and usually with no or minimal recovery of the lithium metal oxide. It would be a major improvement in the recycling of strategic materials and would lower the cost of lithium batteries if the full value of the lithium metal oxide cathode material could be completely recovered and regenerated for direct reuse in a new lithium-ion battery. In addition, almost all of the lithium would also be recovered in the cathode material and remain as part of the lithium metal oxide cathode as it is regenerated and used in the new battery.

The recovery and reuse of the cathode material would lessen pressure on supply of lithium cathode materials such as nickel and cobalt.

U.S. Pat. No. 8,616,475 discloses a recovery process of copper, aluminium, carbon and cathode material from spent lithium ion batteries having lithium metal oxide cathode material. The main drawback of the disclosed method is its limited nature of recovery, and inefficiency to recover metals in their purest form. The method neglects other recoverable materials of spent lithium ion batteries including those present in protection circuit boards. Hence, a single versatile approach is needed to recover all valuable materials present of spent lithium ion batteries in their purest form.

CN101988156 discloses a method for recycling metal components from waste lithium ion batteries wherein metal components are recovered in a pH controlled environment. Further, the method includes use of organic solvents to maintain pH of the processing environment. The pH sensitive approaches requires special attention and works effective at a particular pH which leads to incomplete recovery of metals especially when pH gets deviated from a specified range. Such approaches are thereby, considered to be less effective due to incompleteness of process that also affects quality and quantity of the recovered metals.

CN 1601805A discloses a method for recycling and processing worn-out lithium ion battery to recover cobalt, copper and precious metal elements such as lithium. In this method, the battery components are first crushed and then metals are recovered using chemical approaches depending on the metal to be recovered. The method generates hydrogen fluoride that may immediately convert to hydrofluoric acid, which is highly corrosive and toxic and has serious health effects upon exposure. Further, the recovered metals possess low purity concerns.

US 20130302226A1 discloses a method and apparatus for extracting useful elements like cobalt, nickel, manganese, lithium, and iron from spent lithium ion batteries to produce active cathode materials for new batteries. The disclosed method lacks in versatility to recover metallic contents of spent lithium ion batteries. Further, the disclosed method relates to mixed cathode chemistry and doesn't focus much on purity of separate cathode extraction in their purest form.

Further, a majority of the processes that are known in the art use harmful chemicals to recover the metals in high quantity. On the other hand, state of the art physical processes do not result into recovery of metals, in quantitative as well as qualitative terms. Accordingly, an eco-friendly and cost effective method to recover valuable metals in good quantity without compromising on the quality is required.

OBJECT OF THE INVENTION

Accordingly, the main object of the invention is to provide an improved process for recovering valuable metals from used Lithium Ion batteries.

Yet another object of the invention is to provide a process for recovering cobalt and lithium along with other valuable metals from spent Li Ion batteries.

Yet another object of the invention is to provide a process for recovering valuable metals from Li Ion batteries which majorly includes physical processes for separation, limiting the use of harsh chemicals for removing minor impurities.

Yet another object of the invention is to provide a cost effective, economic and environmental friendly process for recovering valuable metals.

Still another object of the invention is to provide an eco-friendly and cost effective method to recover valuable metals in good quantity without compromising on the quality.

SUMMARY OF THE INVENTION

Accordingly, the present invention relates to an improved process for recovering valuable metals from used Lithium Ion batteries. The invention specifically provides a process for recovering cobalt and lithium along with other valuable metals wherein the method majorly includes physical processes for separation, limiting the use of chemical for removing minor impurities. The invention provides a cost effective, economic and environmental friendly process for recovering valuable metals.

In a preferred embodiment of the present invention, the method of recovering valuable metals from used Lithium Ion batteries comprises the following major steps of:

i) Wet shredding of batteries;
ii) Floatation followed by wet sieving for the separation of metals, electrolyte and plastic/polymer matrix;
iii) Filtration for the separation of mixed metal powder from lithium ion;
iv) Enrichment of cobalt content in lithium free cobalt oxide by drying and roasting;
v) Purification of cobalt oxide by dilute acid wash;
vi) Magnetic separation for removal of printed circuit board and steel from the copper and Aluminum matrix; and
vii) Lithium recovery as lithium carbonate by precipitation of wash liquor of step (iii).

In another embodiment, the present invention provides an approach to handle protection circuit boards present in spent lithium ion batteries wherein the valuable metals like copper, aluminium and gold can be recovered in their purest form for reutilization purposes.

In yet another embodiment, the maximum elements were separated by physical process instead of chemical process which gives the benefit of cost saving in chemical treatment of liquid and solid effluents. Chemicals are only used to dissolve minor impurities from electrolyte which lead to the process economically attractive.

The process is thus unlike those generally used where chemicals are used to dissolve major elements and then for separation of major elements from other impurities. This makes the proposed process of recovering metal values is environment friendly.

BRIEF DESCRIPTION OF THE DRAWINGS

A complete understanding of the system and process of the present invention may be obtained by reference to the following drawings.

DETAILED DESCRIPTION OF THE INVENTION

The present invention will now be described in detail hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

Figure 1:
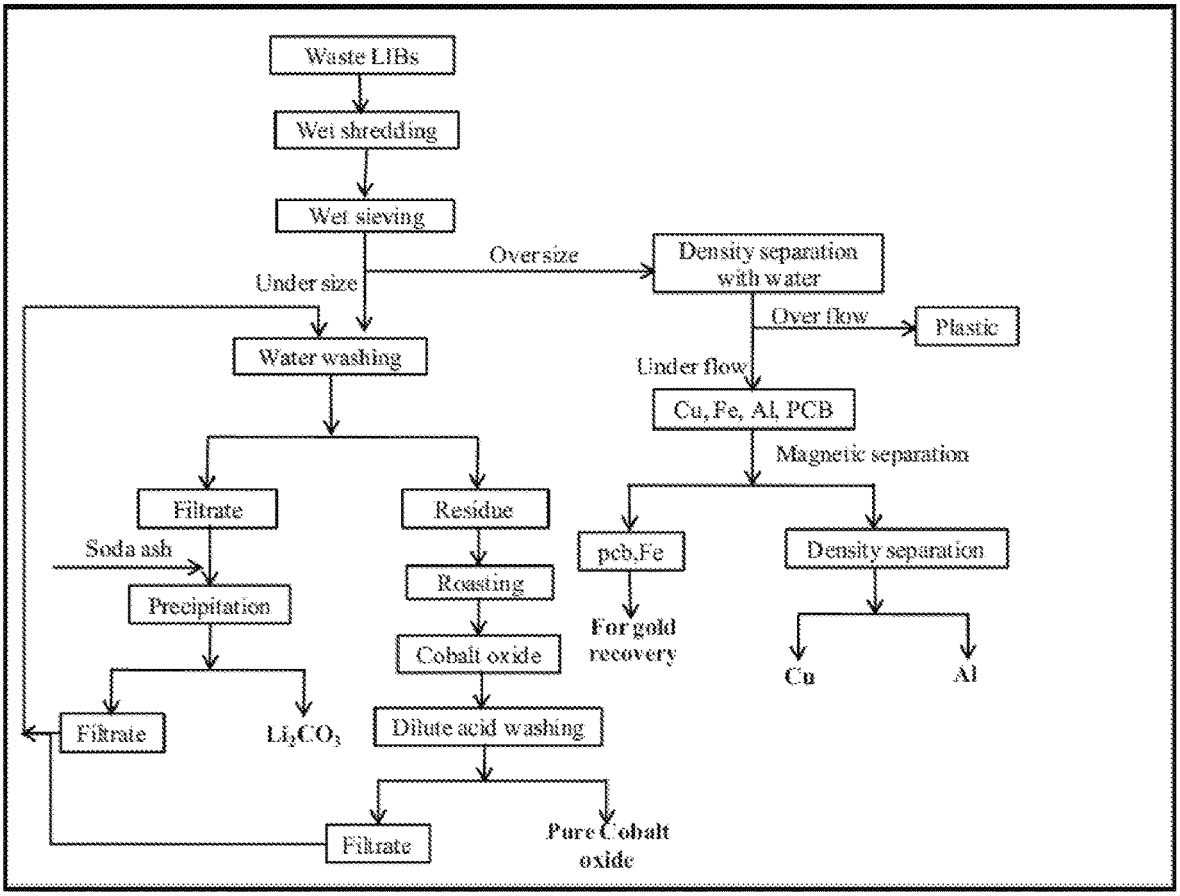
FIG. 1 elucidates the flow sheet of the process according to an embodiment of the invention.

FIG. 1 elucidates the process and method for recovering valuable metals from used Lithium ion batteries without substantial use of chemical solutions. The process majorly depends on physical separation of the metals without compromising on the quality of the recovered products and by-products. The process of the present invention comprises the following steps of:

i) Wet shredding of batteries;
ii) Floatation followed by wet sieving for the separation of metals, electrolyte and plastic/polymer matrix;
iii) Filtration for the separation of mixed metal powder from lithium ion;
iv) Enrichment of cobalt content in lithium free cobalt oxide by drying and roasting;
v) Purification of cobalt oxide by dilute acid wash;
vi) Magnetic separation for removal of printed circuit boards and steel from the copper and Aluminum matrix; and
vii) Lithium recovery as lithium carbonate by precipitation of wash liquor of step (iii).

The two stages of washing of the mixed black powder resulted in satisfactory separation of cobalt and lithium. Lithium in the wash liquor was precipitated using saturated sodium carbonate solution, while cobalt and organic content in the residue were separated through roasting followed by magnetic separation. The major steps of process are described in details as follows:

Wet shredding of spent batteries: In this step, spent LIBs are fed into a shredder in presence of water well above the battery level so that the water acts as a scrubbing agent as well as temperature controller. The wet shredding is carried at room temperature (30±5° C.). The shredder is designed in such a way to achieve a size after shredding of less than 10 mm. The shredder is preferably, a twin shaft shredder with a water spray system and shear type cutting is used.

ii) Wet shredding is followed by floatation and sieving step. In this step, the shredder output slurry containing plastic/polymer matrix floats on water and is removed. The slurry particles of size less than 300 microns are made to pass through a sieve (mesh size 50). The sieve retains metals like copper foils, aluminum casing and PCBs which are then collected.

iii) Filtration for the separation of mixed metal powder from lithium ion: In this step slurry containing particles of size less than 300 microns is filtered through a filter press. The filtrate contains dissolved lithium ions. The residue or filter cake obtained upon filtration contains cobalt ions along with some metal impurities and organic matrix.

iv) Enrichment of cobalt content in lithium free cobalt oxide by drying and roasting: In this step to remove organic matrix from the cake obtained in the step iii, the material is dried and then roasted above 900° C. The enrichment step requires high temperature exposure specifically to cobalt metal and that does not cause any harm to other metals.

v) Purification of cobalt oxide by dilute acid wash: In this step the above roasted material is treated with dilute hydrochloric acid solution at pH between 2.0 to 3.

vi.) Magnetic separation for removal of PCBs, copper and Aluminum matrix: In this step, from the mixture of PCBs, Copper and Aluminum obtained from step (ii), PCBs are separated by using a magnetic separator. The magnetic part contains PCBs and non-magnetic part contains Copper and Aluminum.

vii) Lithium recovery as lithium carbonate by precipitation of wash liquor of step (iii): In this step, the wash liquor obtained from step (iii) is treated with saturated solution of soda ash to increase the pH and maintain it between 11-11.5 at 90 to 100° C. for 4 hrs.

Accordingly, in most preferred embodiment of the present invention is proposed a process for recovering valuable metals from spent lithium ion batteries comprising the steps on a) shredding the lithium ion batteries into particles of a preferable size, i.e. 10 mm, in water, with water level well above the level of the batteries being shredded to obtain a slurry and shredded plastic and polymer matrix;

b) removing the plastic and polymer matrix that floats on the water in step a);

c) wet screening the slurry obtained in step a) through sieve of at least fifty mesh size to separate particles of varying sizes; wherein coarser particles containing copper, aluminum and protection circuit boards form screened slurry containing solids arc retained by the sieve and collected, and finer particles containing lithium and cobalt are aggregated;

d) filtering the lithium and cobalt containing aggregate of step c) through a filter press to obtain a wash liquor containing lithium and a residue containing cobalt, metal impurities and organic matrix;

e) drying the residue of step d) and roasting the dried residue at 900° C. to obtain cobalt oxide;

f) washing and filtering the cobalt oxide of step e) with dilute hydrochloric acid solution at pH range 2.0 to 3.0 to obtain pure cobalt oxide and filtrate;

g) treating the wash liquor of step d) with saturated solution of soda ash at pH range 11 to 11.5 and temperature ranging from 80 to 120° C. for 3-6 hours to obtain lithium carbonate precipitate and supernatant.

In further embodiment, the coarser pieces of step c) of the process are processed using magnetic separator to segregate magnetic part comprising protection circuit boards from non magnetic part comprising copper and aluminum.

In another embodiment, the proposed process provides cobalt oxide with purity of 97% with cobalt content of more than 76% and metal impurity level below 2%.

In another embodiment, the proposed process provides lithium carbonate with purity of 98% with lithium content of more than 18% and metal impurity level below 0.5%.

EXAMPLES

The invention will now be illustrated by the following non-limiting examples.

Example 1

A batch (Batch 1) of 10 kg spent mobile batteries (Samsung—2100 mAh) was taken and processed as per the process specified in the present invention. Initially, wet shredding of spent batteries was done followed by floatation, resulting in removal of about 0.58 Kg of plastics and polymer materials. The materials are then sieved through 50 mesh wherein the mixture (about 2.32 Kg) of PCBs and metals like copper, aluminum are retained and collected.

The slurry containing particles of size less than 300 microns is subjected to filtration. Upon filtration, the cake weighing about 5.78 Kg (dry wt.) and filtrate (about 30 liters) containing dissolved lithium metals are obtained.

The mixture (about 2.32 Kg) of PCB, aluminum and copper was then magnetically separated that provides about 0.109 kg of PCB's for gold recovery process. The remaining amount (about 2.21 Kg) of mixture was subjected to density separation (using air) which leads to separation of aluminum (1.5 Kg) and copper (0.7 Kg) selectively.

The cake (5.78 Kg) obtained in the filtration step was roasted at 900° C. for at least 9 hours. After roasting, about 1.38 Kg residue is obtained, which was further purified by agitating it with dilute hydrochloric acid (pH 2-3) for 2 hrs followed by filtration and drying. The obtained purified cake contains about 1.35 Kg of pure cobalt oxide powder.

The filtrate (about 30 liters) was agitated with about 3.6 liters of saturated soda ash solution at 90-100° C. for at least 4 hours resulting in the precipitation of lithium as lithium carbonate. The precipitated slurry was filtered, washed with hot water and dried to get pure lithium carbonate (about 1.13 Kg).

Example 2

Another batch (Batch 2) of 10 kg spent mobile batteries (Samsung—2600 mAh) was taken and processed. In the first step, the batteries were shredded in wet environment and subjected to floatation step that resulted in removal of about 0.85 Kg of plastics and polymer materials. These materials were sieved using 50 mesh size sieve wherein the mixture (about 3.37 Kg) of PCBs and metals like copper, aluminum are retained and collected.

The slurry containing particles of size less than 300 microns is subjected to filtration. Upon filtration, the cake weighing about 4.55 Kg (dry wt.) and filtrate (about 30 liters) containing dissolved lithium metals are obtained.

The mixture (about 3.37 Kg) of PCB and metals like copper, aluminum was then magnetically separated that provides about 0.109 kg of PCB's for gold recovery process. The remaining amount (about 3.26 Kg) of mixture was subjected to density separation (using air) which leads to separation of aluminum (1.68 Kg) and copper (0.7 Kg) selectively.

On the other hand, the cake (4.55 Kg) obtained after filtration step was roasted at 900° C. for 9 hours to get about 1.41 Kg of roasted powder. The obtained roasted powder was further purified by agitating it with dilute hydrochloric acid (pH 2-3) for 2 hrs followed by filtration and drying. The purified cake obtained from Batch 2 contains about 1.37 Kg of pure cobalt oxide powder.

The filtrate (about 30 liters) was agitated with about 3.6 liters of saturated soda ash solution at 90-100° C. for at least 4 hours resulting in the precipitation of lithium as lithium carbonate. The precipitated slurry was filtered, washed with hot water and dried to get pure lithium carbonate (about 1.04 Kg).

The products obtained in the above process were analyzed by MP-AES (microwave plasma-atomic emission spectra) and the analyses were presented in Table 1 and 2.

TABLE 1

| Chemical analysis of cobalt oxide (%) | | | | | | | | |
|---|---|---|---|---|---|---|---|---|
| Co | Cu | Li | Pb | Mn | Al | Ni | Fe | Zn |
| 76.2 | 0.35 | 1.09 | BDL | BDL | 0.31 | BDL | 0.19 | BDL |

TABLE 2

| Chemical analysis of lithium carbonate (%) | | | | | | | | |
|---|---|---|---|---|---|---|---|---|
| Li | Cu | Pb | Mn | Al | Ni | Fe | Zn | Co |
| 18.68 | BDL | BDL | BDL | 0.1 | BDL | BDL | BDL | BDL |

The X-ray diffraction (XRD) pattern of the same products (cobalt oxide and lithium carbonate) was characterized by using a powder diffractometer (Bruker, D8 Advance).

Figure 2:
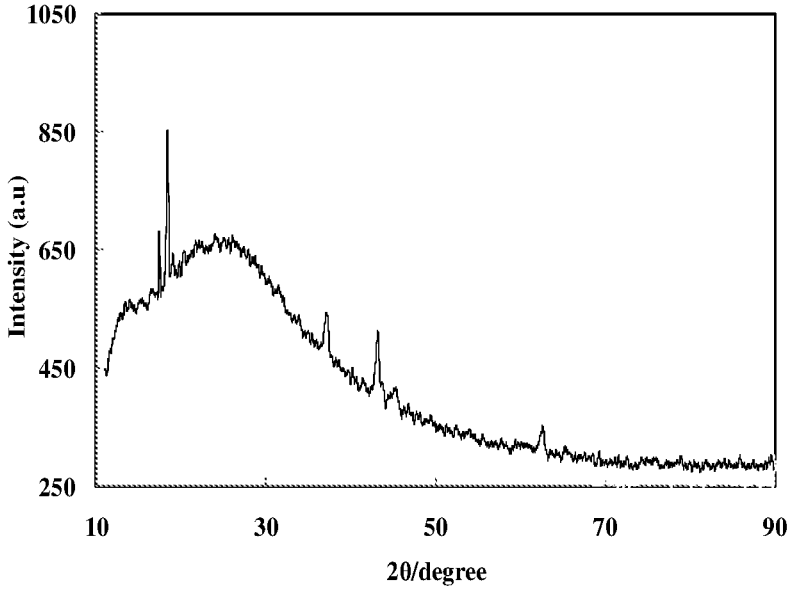
FIG. 2 elucidates the X-ray diffraction pattern (XRD) of recovered cobalt oxide from spent lithium-ion battery.

The major peaks at 20 values (36.86), (42.82) and (62.17) correspond to the hk1 values (111), (200) and (220), respectively are of Cobalt oxide (FIG. 2). It is a cubic type structure and the pattern is in good agreement with the JCPDS card No. 43-1004. The other two peaks at 2θ values (18.21) and (18.34) are due to the traces amount of LiCoO2, which was again confirmed from the chemical analysis of the obtained cobalt oxide (Table 1).

Figure 3:
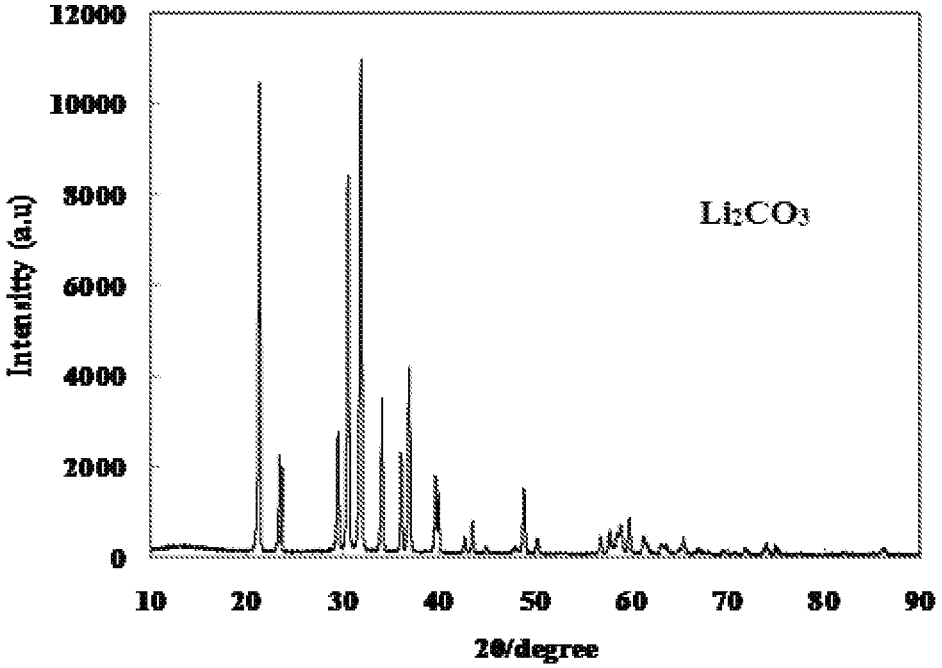
FIG. 3 elucidates X-ray diffraction (XRD) pattern of pure lithium carbonate obtained from spent lithium-ion battery.

Referring to FIG. 3, diffraction (XRD) pattern of pure lithium carbonate obtained from spent lithium-ion battery is elucidated. The major peaks at 2θ values (21.32), (30.61), (31.80) and (36.95) corresponds to the hk1 values (110), (202), (002) and (311), respectively. The lithium carbonate has monoclinic type structure and the pattern was found in good agreement with the JCPDS card No. 22-1141.

The purity of the products obtained during the processes was analyzed by Microwave Plasma Atomic emission spectra (MP-AES). Purity of cobalt oxide obtained was around 97% and that of Lithium carbonate was found to be 98%.

The details of the process steps and quantity of recovered metals are summarized in the Table 3.

TABLE 3

| Summary of the process | | | | | | | | |
|---|---|---|---|---|---|---|---|---|
| | | Batch no Batch 1 | | | | | | |
| | | Input | | | Output | | | |
| Step No | Process | Material | quantity | unit | Material | quantity | unit |
| 1 | Wet shredding | Spent LIBs (samsung-2100 mAh) | 10 | Kg | Shredded material | 9.48 | Kg |
| 2 | Floation | Shredded material | 9.48 | Kg | Polymeric | 0.58 | Kg |
| | | | | | Slurry (Al, Cu, PCB, black powder) | 8.9 | Kg |
| 3 | Wet sieving followed by filtration | Slurry (Al, Cu, PCB, black powder) | 8.9 | Kg | Mixture of Al, Cu and PCB | 2.32 | Kg |
| | | | | | Cake (dry Wt) | 5.78 | Kg |
| | | | | | Filtrate | 30 | Lt |
| 4 | Separation of Al, Cu and PCB by magnetic separator | Mixture of Al, Cu and PCB | 2.32 | Kg | Al and Cu | 2.21 | Kg |
| | | | | | PCB | 0.109 | Kg |
| 5 | Density separation of Al and Cu | Al and Cu | 2.21 | Kg | Al | 1.5 | Kg |
| | | | | | Cu | 0.7 | |
| 6 | Roasting of cake | Dry Cake | 5.78 | Kg | Roasted powder | 1.387 | Kg |
| 7 | Purification | Roasted powder | 1.387 | Kg | Purified cobalt oxide | 1.35 | Kg |
| 8 | Lithium precipitation | Filtrate | 30 | Lt | $Li_2CO_3$ | 1.13 | Kg |

TABLE 3-continued

| Summary of the process | | | | | | |
|---|---|---|---|---|---|---|
| | Batch no Batch 2 | | | | | |
| | Input | | | Output | | |
| Step No | Material | quantity | unit | Material | quantity | unit |
| 1 | Spent LIBs (samsung-2600 mAh) | 10 | Kg | Shredded material | 9.57 | Kg |
| 2 | shredded material | 9.57 | Kg | Polymeric | 0.85 | Kg |
| | | | | Slurry (Al, Cu, PCB, black powder) | 8.72 | Kg |
| 3 | Slurry (Al, Cu, PCB, black powder) | 8.72 | Kg | Mixture of Al, Cu and PCB | 3.37 | Kg |
| | | | | Cake(dry Wt) | 4.55 | Kg |
| | | | | Filtrate | 30 | Lt |
| 4 | Mixture of Al, Cu and PCB | 3.37 | Kg | Al and Cu | 3.26 | Kg |
| | | | | PCB | 0.109 | Kg |
| 5 | Al and Cu | 3.26 | Kg | Al | 1.68 | Kg |
| | | | | Cu | 0.7 | Kg |
| 6 | Dry Cake | 4.55 | Kg | Roasted powder | 1.411 | Kg |
| 7 | Roasted powder | 1.411 | Kg | Purified cobalt oxide | 1.37 | Kg |
| 8 | Filtrate | 30 | Lt | $Li_2CO_3$ | 1.04 | Kg |

We claim:

1. A process for recovering valuable metals from spent lithium ion batteries comprising the steps of:

a) shredding the lithium ion batteries into particles of a preferable size, in water, with water level well above the level of the batteries being shredded to obtain a slurry and shredded plastic and polymer matrix;

b) removing the plastic and polymer matrix that floats on the water in step a);

c) wet screening the slurry obtained in step a) through sieve of 50 mesh to separate particles based on sizes wherein coarser particles containing copper, aluminum and protection circuit modules form screened slurry containing solids are retained by the sieve and collected, and finer particles containing lithium and cobalt are aggregated;

d) filtering the lithium and cobalt containing aggregate of step c) through a filter press to obtain a wash liquor containing lithium and a residue containing cobalt, metal impurities and organic matrix;

e) drying the residue of step d) and roasting the dried residue at 900° C. to obtain cobalt oxide;

f) washing and filtering the cobalt oxide of step e) with dilute acid solution at pH range 2.0 to 3.0 to obtain pure cobalt oxide and filtrate;

g) treating the wash liquor of step d) with saturated solution of soda ash at pH range 11 to 11.5 and temperature ranging from 80 to 120° C. for 3-6 hours to obtain lithium carbonate precipitate and supernatant.

2. The process for recovering metals of value as claimed in claim 1, wherein the size of particles obtained through shredding is less than 10 mm.

3. The process for recovering metals of value as claimed in claim 1, wherein the coarser pieces of step c) are processed with magnetic separator to segregate magnetic part comprising protection circuit module from non magnetic part comprising copper and aluminum.

4. The process for recovering metals of value as claimed in claim 1, wherein the supernatant of step g) and the filtrate of step f) are subsequently mixed and processed by repetition of step d) to step g).

5. The process for recovering metals of value as claimed in claim 1, wherein the dilute acid solution is hydrochloric acid solution.

6. The process for recovering metals of value as claimed in claim 1, wherein the cobalt oxide obtained in step f) has purity of 97% with cobalt content of more than 76%.

7. The process for recovering metals of value as claimed in claim 1, wherein the cobalt oxide obtained in step f) has metal impurity level below 2%.

8. The process for recovering metals of value as claimed in claim 1, wherein the lithium carbonate obtained in step g) has purity of 98% with lithium content of more than 18%.

9. The process for recovering metals of value as claimed in claim 1, wherein the lithium carbonate obtained in step g) has metal impurity level below 0.5%.

*10. A method for recovering valuable metals from spent lithium-ion batteries comprising:*

*wet shredding the lithium-ion batteries to obtain a slurry, and shredded plastic and polymer matrix;*

*wet sieving the slurry so that coarse particles including copper, aluminum, and protection circuit modules are retained by a sieve, and a liquid, including dissolved lithium, and fine particles of cobalt, passes through the sieve;*

*filtering the liquid to obtain a wash liquor, including dissolved lithium, and a residue including cobalt, metal impurities, and organic matrix; and*

*treating the wash liquor with a saturated solution of soda ash at a pH between 11 and 11.5 to obtain lithium carbonate precipitate and a supernatant liquid, wherein the wash liquor is treated with the saturated solution of soda ash at a temperature between 80° C. and 120° C. for 3 hours to 6 hours.*

*11. The method of claim 10, wherein the slurry includes particles of less than 300 microns.*

*12. The method of claim 10, wherein the sieve has a mesh size equal to 50 mesh.*

*13. The method of claim 10, wherein the wash liquor is treated with the saturated solution of soda ash at a temperature between 90° C. and 100° C. for 4 hours.*

*14. The method of claim 10, further comprising recycling the supernatant liquid to the filtering step.*

*15. The method of claim 10, further comprising drying the residue and roasting the dried residue to obtain cobalt oxide.*

*16. The method of claim 15, wherein the dried residue is roasted at a temperature equal to at least 900° C.*

*17. The method of claim 15, further comprising washing and filtering the cobalt oxide with dilute acid solution at a pH between 2 and 3 to obtain cobalt oxide, having around 97% purity, and filtrate.*

*18. The method of claim 17, further comprising recycling the filtrate to the step of filtering the liquid to obtain a wash liquor.*

* * * * *